United States Patent [19]

Windsor

[11] 4,412,461
[45] Nov. 1, 1983

[54] ROTARY TRANSMISSION ELECTRONIC CONTROL SYSTEM PROVIDING AUTOMATIC CHANGES OF SPEED RATIO

[75] Inventor: Harry M. Windsor, Harbury, England

[73] Assignee: Automotive Products Limited, Leamington Spa, England

[21] Appl. No.: 237,691

[22] Filed: Feb. 24, 1981

[30] Foreign Application Priority Data

Feb. 28, 1980 [GB] United Kingdom .............. 8006846

[51] Int. Cl.³ ............................................ B60K 41/28
[52] U.S. Cl. ...................................... 74/866; 74/864; 192/0.032; 192/0.052; 192/0.092
[58] Field of Search ............. 74/866, 861, 864, 752 D; 192/0.032, 0.052, 0.092

[56] References Cited

U.S. PATENT DOCUMENTS

| 4,082,013 | 4/1978 | Dornfield et al. ............ 74/866 |
| 4,208,929 | 6/1980 | Heino et al. ............ 74/866 X |
| 4,324,322 | 4/1982 | Sibeud ............ 74/866 X |

FOREIGN PATENT DOCUMENTS

| 145827 | 6/1920 | United Kingdom . |
| 585716 | 2/1947 | United Kingdom . |
| 753598 | 7/1956 | United Kingdom . |
| 795260 | 5/1958 | United Kingdom . |
| 970535 | 9/1964 | United Kingdom . |
| 983245 | 2/1965 | United Kingdom . |
| 1155196 | 6/1969 | United Kingdom . |
| 1225267 | 3/1971 | United Kingdom . |
| 1249180 | 10/1971 | United Kingdom . |
| 1420307 | 1/1976 | United Kingdom . |
| 1514971 | 6/1978 | United Kingdom . |
| 1531434 | 11/1978 | United Kingdom . |
| 3592 | 2/1979 | United Kingdom . |
| 2012892 | 8/1979 | United Kingdom . |
| 1174701 | 12/1979 | United Kingdom . |

Primary Examiner—Rodney H. Bonck
Attorney, Agent, or Firm—Kemon & Estabrook

[57] ABSTRACT

A control system is provided for a rotary transmission having a set gear trains and two clutches independently operable and providing alternative drive paths through the gear trains from an input to an output, alternate gear trains in the set being driven respectively through one and the other clutch. The control system includes sensor means to sense the operating state of the transmission, command means to command a change in the operating state of the transmission, control means responsive to the sensor means and the command means and including an array of electronic logic elements to control the transmission in a given series of discrete steps and operating means arranged to operate the transmission.

4 Claims, 2 Drawing Figures

ROTARY TRANSMISSION ELECTRONIC CONTROL SYSTEM PROVIDING AUTOMATIC CHANGES OF SPEED RATIO

This invention relates to an electronic control system for a rotary transmission of the dual clutch kind by which is meant a transmission having gear trains, each being one of a set providing a series of increasing speed ratios, and two clutches independently operable and providing alternative drive paths between a common input and a common output, the gear trains of alternate speed ratios in the set being driven respectively through one and the other clutch.

The invention is particularly though not exclusively applicable to drive transmission for motor vehicles.

Examples of transmissions of the dual clutch kind are shown in British Patent Specification Nos. 145,827 (Bramely-Moore), 585,716 (Kegresse), 795,260 (David Brown) and 1,225,267 (Bosch).

According to the present invention there is provided a control system of a rotary transmission of the dual clutch kind and comprising:

For each clutch and each speed ratio sensor means for sensing and producing a feedback signal indicating a state of engagement or disengagement;

Command means responsive to transmission operating parameter signals to produce a command signal indicating a required speed ratio;

Control means arranged to combine said feedback signals and said command signal to produce control signals to control clutch and speed ratio engagement and disengagement through an array of electronic logic elements in a given sequence of discrete steps, each discrete step being initiated by a change in state of a feedback signal; and Operating means arranged to engage and disengage each clutch and each speed ratio in response to said control signals.

Preferably the array of electronic logic elements is arranged to produce a control signal for a transmission speed ratio change in the series of discrete steps comprising:

(a) Disengage the hitherto non-driving clutch;
(b) Pre-select the next required speed ratio;
(c) Simultaneously disengage the hitherto driving clutch and engage the hitherto non-driving clutch;
(d) De-select the hitherto driving speed ratio;
(e) Re-engage the non-driving clutch.

The array of electronic logic elements may include for each clutch and each speed ratio, a bi-stable switch whose output constitutes a bi-stable control signal for said operating means.

Other features of the invention are included in the following description of a preferred embodiment shown, by way of example only, in the accompanying drawings in which.

Figure 1:
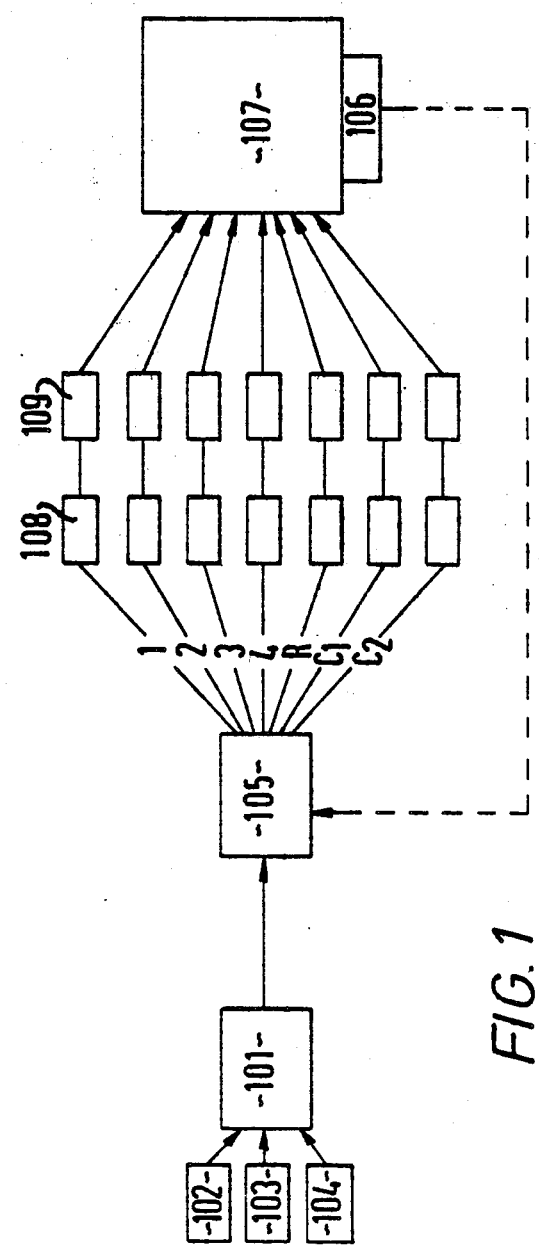
FIG. 1 shows, in block diagram form, an automatic control mechanism for a transmission of the dual clutch kind and suitable for a motor vehicle, the transmission having four forward speed ratios and a reverse speed ratio.

Referring to FIG. 1, the automatic control mechanism for a transmission of the dual clutch kind includes electronic speed ratio command means 101, for example responsive to transmission operating parameters, and supplied with a signal indicative of vehicle road speed from a tachogenerator 102 and a signal indicative of vehicle throttle opening from a potentiometer 103. The command means 101 is also supplied with an input signal from a driver controlled gear selector lever 104, which may include the usual DRIVE, NEUTRAL, and REVERSE positions.

The command means 101 provides a command signal for controlling the selection of the appropriate speed ratio in accordance with the input signals. Speed ratio selection may be automatic or may be driver overridden by the use of the gear selector lever 104. Such a system is more fully described in British Pat. No. 1,420,307 and Patent of Addition 1,531,434.

A transmission of the dual clutch kind is controlled in a particular sequence of clutch and speed ratio selection operations. Thus there is provided a speed ratio sequence controller 105 responsive to the outputs from the command means 101 to control the transmission 107 in the appropriate sequence. The controller 105 is further responsive to feedback signals from transmission sensor means 106 indicative of the state of engagement of disengagement of each clutch and each speed ratio of the transmission 107.

Electro-hydraulic valves 108 responsive to signals from the controller 105, control the operation of transmission clutches and speed ratio selectors through hydraulic actuators 109. Conveniently one valve and one actuator are provided for each speed ratio and each clutch, as indicated. Fluid under pressure is supplied to the valves 108 and actuators 109 from a hydraulic pump (not shown) which may be driven by the transmission 107.

The valves 108 are of the on/off type and corresponding movement of the selector actuators 109 is not responsive to transmission operating conditions. Whilst this is acceptable for speed ratio selection some extra measure of clutch control is desirable and means for controlling the rate of engagement and disengagement of each clutch may be additionally provided. Such clutch control means are well known in the art of automatic transmission control.

In this example the delay means could operate on the off-going or on-coming clutch. They would act for example to delay a changing signal in the path from AND element 27 to BC1 for Clutch 1 and to delay a changing signal in the path from AND element 17 to BC2 for Clutch 2.

Figure 2:
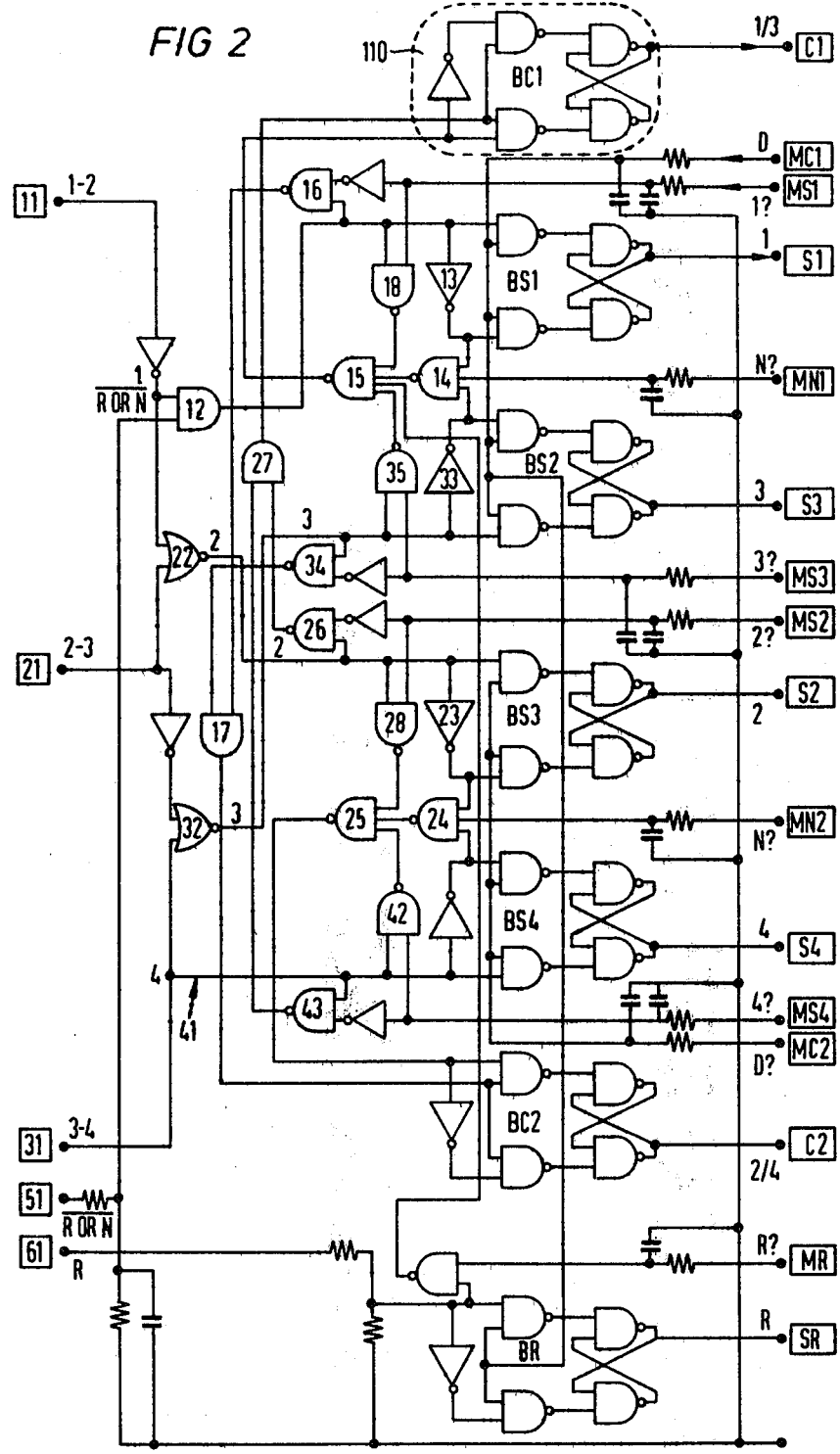
FIG. 2 shows an electronic speed ratio sequence controller for a transmission of the dual clutch kind and comprising electronic logic elements.

Referring to FIG. 2 there is shown the speed ratio sequence controlling 105 in detail. The controller circuit comprises conventional electronic logic elements connected together to ensure correct sequencing of the actuators 109 in response to signals from the command means 101. All electrical signals processed by the controller are of the on/off type.

The circuit includes AND elements, exemplified by 27; NAND elements, exemplified by 15; NOR elements, exemplified by 22; and INVERTERS, exemplified by 13.

The controller circuit will now be described in detail and its operation illustrated by three examples:

(1) selection of 1st speed and drive from vehicle rest
(2) speed ratio up change, from 1st speed to 2nd speed
(3) speed ratio down change from 4th speed to 3rd speed.

Inputs to the controller 105 from the command means 101 are:

11, 'on' when second, third or fourth speed ratio is required, otherwise 'off'

21, 'on' when third or fourth speed ratio is required, otherwise 'off'

31, 'on' when fourth speed ratio is required, otherwise 'off'

51, 'off' when reverse speed or neutral is required, otherwise 'on'

61, 'on' when reverse speed is required, otherwise 'off'

Outputs from the controller 105 to the solenoid valve 108 are:

C1, 'on' when Clutch 1 is to be disengaged, otherwise 'off'

C2, 'on' when Clutch 2 is to be disengaged, otherwise 'off'

S1, 'on' when first speed is to be selected, otherwise 'off'

S2, 'on' when second speed is to be selected, otherwise 'off'

S3, 'on' when third speed is to be selected, otherwise 'off'

S4, 'on' when fourth speed is to be selected, otherwise 'off'

SR, 'on' when reverse speed is to be selected otherwise 'off'

Feedback signals to the controller 105 are provided, by for example micro-switches, to sense completion of an operation; these are:

MC1, 'on' when Clutch 1 is disengaged, otherwise 'off'

MC2, 'on' when Clutch 2 is disengaged, otherwise 'off'

MS1, 'on' when first speed is selected, otherwise 'off'

MS2, 'on' when second speed is selected, otherwise 'off'

MS3, 'on' when third speed is selected, otherwise 'off'

MS4, 'on' when fourth speed is selected, otherwise 'off'

MR, 'on' when reverse is selected otherwise 'off'

A transmission of the dual clutch kind may be derived from a conventional manual-change transmission where a single internal selector arm can select one of two speed ratios. It is necessary to supply the controller with feedback signals to indicate whether the selector arms are in the 'neutral' position, these are:

MN1, 'on' when first/third speed selector arm is in the 'neutral' position, otherwise 'off'

NM2, 'on' when second/fourth speed selector arm is in the 'neutral' position, otherwise 'off'

The inputs 11, 21 and 31 are respectively intended for connection to the outputs from the Schmitt trigger circuits "26", "27" and "28" described in British Pat. No. 1,420,307.

The state of each output signal from the controller 105 is determined by a respective bi-stable switch, in this case an R-S flip flop. The switches are anotated to correspond with their respective solenoid valves ie. BS1 for S1, BC2 for C2, etc. The components parts of one such switch are indicated by the dotted outline 110.

Other logic elements of the controller circuit inhibit the bi-stable switches as appropriate to the desired operational sequence.

1. Selection of 1st speed and drive from vehicle rest, both Clutches being passively engaged.

In NEUTRAL no speed ratio will be selected and both clutches are engaged; thus all the inputs to the controller 105 will be 'off' except, MN1 and MN2 which will be 'on'. The state of the inputs to each logic element for NEUTRAL may be determined by a person skilled in the use and function of logic elements from the state of the inputs to the controller circuit.

The desired sequence of servo control is:
(a) Disengage C1
(b) Select S1
(c) Engage C1
(a) Disengage C1

As the vehicle driver shifts the gear selector lever 104 to DRIVE the input 51 will change state to change the output from 12. Consequently 13, 14 and 15 will change state to switch BC1 'on' Clutch C1 will disengage. 16 and 17 will also change state but BC2 is unaffected.

(b) Select S1

As C1 is disengaged MC1 switches to 'on' and BS1 changes state, S1 is selected.

(c) Engage C1

As S1 is selected MS1 switches 'on', 18 and 15 change state and BC1 switches off. C1 re-engages preferably under the control of suitable clutch control means as previously mentioned. 16 and 17 change state once again, BC2 remains unaffected.

MN1 switches 'off', 14 remains unchanged.

As C1 engages MC1 changes state, BS1 remains unchanged and first speed is held.

2. Speed ratio up-change: 1st speed to 2nd speed

The desired sequence of servo control is:
(a) Disengage C2
(b) Pre-select S2
(c) Engage C2, Disengage C1
(d) De-select S1
(e) Engage C1
(a) Disengage C2

When the command means 101 indicates an upchange from 1st to 2nd 11 will change and consequently 12 and 22. Delay means (not shown) will ensure that the change of state of 22 is given priority in the controller circuit. Such delay means would be, for example, an R—C circuit on whose time constant the delay period would depend, R—C circuits are frequently used where a time delay is required in electrical circuits.

22 changes state; 23, 23 and 25 all change state and consequently BC2, C2 disengages.

26 and 27 change state BC1 remains unchanged.

12 changes state; 18 and 15 change state, BC1 remains unchanged; 16 unchanged; BS1 unchanged (b) Pre-select S2

As C2 disengages, MC2 changes state. Consequently BS2 changes state and S2 is selected.

(c) Engage C2, Disengage C1

As S2 is pre-selected, MS2 changes state; 28 and 25 change state and BC2 switches off, C2 re-engages.

26 and 27 change state; BC1 switches on and C1 disengages. MN2 changes state; 14 remains unchanged.

(d) De-select S1

As C2 re-engages, MC2 changes state; BS2 remains unchanged.

As C1 disengages, MC1 changes state; BS1 switches off and S1 is de-selected.

(e) Re-engage C1

As S1 is de-selected MN1 and MS1 change state; 14 and 15 change state, BC1 switches off and C1 re-engages. 18 and 16 remain unchanged.

The speed ratio change is now complete, second speed is held and both clutches engaged.

3. Speed ratio downchange: 4th speed to 3rd speed

In fourth speed both clutches will be engaged and fourth speed ratio selected. The input to the controller circuit for 4th speed at 41 is a result of 11, 21 and 31 being switched on. The desired sequence of servo control is:

(a) Disengage C1
(b) Pre-select S3
(c) Engage C1, Disengage C2
(d) De-select S4
(e) Engage C2
(a) Disengage C1

When the command means 101 indicates a downchange from 4th or 3rd, 31 will change state and the 4th speed input at 41 will also change state. Delay means (not shown) ensures that the change of state of 32 is given priority in the controller circuit.

32 changes state: 33, 14 and 15 all change state. BC1 switches 'on' and C1 disengages. 34 and 17 change state, BC2 remains unchanged.

The input at 41 changes state: 42 and 25 change state. BC2 remains unchaged. 43 remains unchanged. BS4 remains unchanged.

(b) Pre-select S3

As C1 disengages, MC1 changes state. BS3 switches 'on' S3 is selected.

(c) Engage C1, Disengage C2

As S3 is selected, MS3 changes state. 35 and 15 change state, BC1 switches 'off' and C1 re-engages. 34 and 17 change state, BC2 switches 'on' and C2 disengages. MN1 changes state: 12 remains unchanged.

(d) De-select S4

As C1 re-engages, MC1 changes state: BS3 remains unchanged.

As C2 disengages, MC2 changes state: BS4 switches 'off' and S4 is de-selected.

(e) Re-engage C2

As S4 is de-selected MN2 and MS4 change state. 24 and 25 change state, BC2 switches 'off' and C2 re-engages. 42 and 43 remain unchanged.

The speed ratio change is now complete, third speed is held and both clutches are engaged.

Other speed ratio changes are completed in similar sequence of operations.

Reverse gear is inhibited in normal operation by the reverse gear input 61 being 'off'. When REVERSE is selected by the vehicle driver all forward speed ratios are inhibited by the input 51 being switched 'on'.

The microswitches MS1-MS4, MN1-2, MC1-2, MR are necessary to provide a signal to the controller of the completion of an event in the transmission. It is anticipated that a time delay could be substituted for some or all of the switches so that the completion of the transmission event is assumed after a given time period.

Furthermore, a single micro switch may be substituted for the three individual micro switches of a given selector rail, for example MN1, MS1 and MS3, so that the respective micro switch senses merely that the selector rail has reached a given position and assumed a final state. Electronic means would be incorporated to ensure that for a given operational step in the control sequence, the respective micro switch would change state twice to ensure that movement of the respective selector rail from one position to another has been sensed.

I claim:

1. A control system for a rotary power transmission having:
    a common input shaft;
    a common output shaft;
    a set of gear trains between said input and output shafts and providing a series of increasing speed ratios;
    a first clutch engagable to establish driving connection between said input and output shafts, through at least one of said gear trains;
    a second clutch engagable to establish driving connection between said input and output shafts, through one other of said gear trains;
    the gear trains of alternate speed ratios in the set being arranged for drive to be established respectively through said first clutch and said second clutch;
    said control system comprising:
    sensor means for each of said clutches and each of said speed ratios for sensing and producing a feedback signal indicating a state of engagement;
    command means responsive to transmission operating parameter signals to produce a command signal indicating a required speed ratio;
    control means arranged to combine said feedback signals and said command signal to produce control signals to control clutch and speed ratio engagement and dis-engagement through an array of electronic logic elements in a given sequence of discrete steps, each discrete step being initiated by a change in state of a feedback signal; and
    operating means arranged to engage and disengage each clutch and each speed ratio in response to said control signals.

2. The control system of claim 1, wherein said array of electronic logic elements is arranged to produce a control signal for transmission of drive through said one gear train from a NEUTRAL state in which no speed ratio is selected and both of said first and second clutches are engaged and in a series of discrete steps comprising:
    (a) Disengage said first clutch;
    (b) Pre-select said one gear train;
    (c) Engage said first clutch.

3. The control system of claim 1, wherein said array of electronic logic elements is arranged to produce a control signal for a transmission ratio change in which drive through said first clutch and said one gear train is disengaged and drive through said second clutch and said other gear train is engaged and said sequence of discrete steps comprises:
    (a) Disengage the second clutch;
    (b) Pre-select said other gear train;
    (c) Simultaneously disengage the first clutch and engage the second clutch;
    (d) De-select said one gear train;
    (e) Re-engage said first clutch.

4. A control system according to claim 3, wherein said array of electronic logic elements include for each clutch and each gear train, a bistable switch whose output comprises a bistable control signal for said operating means.

* * * * *